United States Patent [19]
Harris et al.

[11] 4,221,659
[45] Sep. 9, 1980

[54] PROCESS FOR REDUCING DICHLOROBUTENE CONTAMINATION IN AQUEOUS PLANT WASTES

[75] Inventors: Alexander T. Harris; Thomas J. Kelly, both of Metairie; Terry W. Redwine, La Place, all of La.

[73] Assignee: E. I. Du Pont de Nemours and Company, Wilmington, Del.

[21] Appl. No.: 24,599

[22] Filed: Mar. 28, 1979

[51] Int. Cl.$^2$ .......................... B01D 3/00; B01D 11/00
[52] U.S. Cl. ..................................... 210/639; 260/655
[58] Field of Search ...................... 210/2, 21; 260/652, 260/655, 705

[56] References Cited
U.S. PATENT DOCUMENTS

| | | | |
|---|---|---|---|
| 1,955,065 | 4/1934 | Hewley | 210/2 |
| 2,919,246 | 12/1959 | Boer et al. | 210/21 |
| 3,217,049 | 11/1965 | Bonem | 260/652 |

Primary Examiner—Thomas G. Wyse
Assistant Examiner—E. Rollins Cross

[57] ABSTRACT

Chlorinated organic compounds from the aqueous waste streams from a process for manufacturing and isomerizing dichlorobutenes and dehydrochorinating 3,4-dichlorobutene-1 to chloroprene, which is the principal monomer in the manufacture of neoprene rubber, are removed by means of a process, wherein the aqueous waste from the dichlorobutene-isomerization step and brine formed in the dehydrochlorination step are combined to produce an aqueous solution containing about 1–5% sodium chloride and the solution, while maintained at a pH of less than about 6, is extracted with a small amount of a liquid hydrocarbon. The liquid hydrocarbon extract is then incinerated, while the extracted aqueous solution is discharged into a natural body of water. In this way, the level of 1,4-dichlorobutene-2, which is toxic to fish, in the natural body of water can be maintained at a safe level.

7 Claims, 1 Drawing Figure

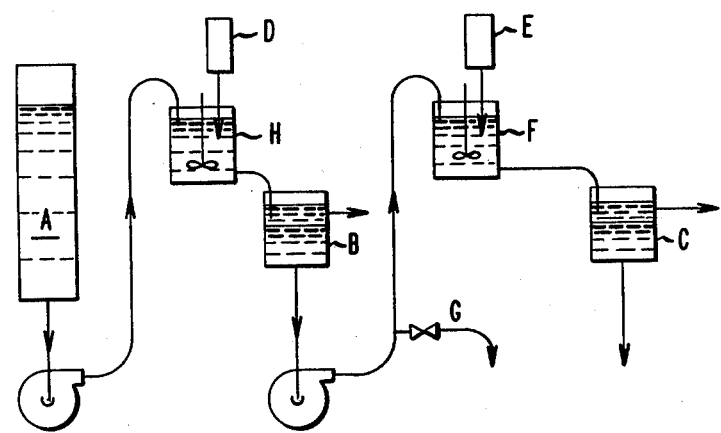

PROCESS FOR REDUCING DICHLOROBUTENE CONTAMINATION IN AQUEOUS PLANT WASTES

BACKGROUND OF THE INVENTION

This invention is directed to a process for the removal of chlorinated organic compounds from aqueous waste streams in dichlorobutene manufacturing plants. Chloroprene (2-chlorobutadiene-1,3), the principal monomer from which neoprene rubber is made, is usually produced commercially by dehydrochlorination of 3,4-dichlorobutene-1 (hereafter, sometimes referred to as 3,4-DCB). A mixture of dichlorobutenes, containing both 3,4-DCB and 1,4-dichlorobutene-2, (hereafter, sometimes referred to as 1,4-DCB), is obtained by the vapor-phase chlorination of 1,3-butadiene. The relative proportions of the 1,4-DCB and 3,4-DCB isomers can be changed according to various isomerization processes including those described in U.S. Pat. Nos. 3,515,760 to Wild and 3,819,730 to Nakata et al and British Pat. Nos. 1,058,768 to Imperial Chemical Industries, Ltd. and 800,787 to The Distillers Company, Ltd. The process of U.S. Pat. No. 3,819,730, as shown in Example 6 of this reference, can be operated continuously by refluxing the dichlorobutene mixture with the catalyst system at a reduced pressure. In the plant, reduced pressure is often obtained by means of steam jets. Unavoidably, some 1,4-DCB and 3,4-DCB vapors are entrained by steam and, when steam is later condensed, remain dispersed in the resulting waste water. Frequently, this waste water is combined with brine from the 3,4-DCB dehydrochlorination step and discharged into natural bodies of water, such as lakes, rivers, or river estuaries. However, because of the high toxicity of 1,4-DCB to fish, for example, to salmon, the concentration of 1,4-DCB in the aqueous waste stream must be kept at a sufficiently low level to avoid depleting the aquatic life. It has been experimentally determined that the maximum biologically safe concentration of 1,4-DCB in the plant waste effluent water should not exceed about 27 parts per billion (ppb). Assuming a dilution factor of about 1,700 when aqueous DCB wastes are combined with other aqueous plant wastes, the maximum tolerable level of 1,4-DCB in the industrial DCB process waste stream can thus be calculated to be about 46 parts per million (ppm). It is, therefore, important to provide a process capable of reducing the level of 1,4-DCB in aqueous DCB wastes to less than the above figure.

SUMMARY OF THE INVENTION

According to the present invention, there is now provided a process for reducing the level of 1,4-DCB in aqueous wastes from an integrated chloroprene-manufacturing process, said integrated process comprising at least a dichlorobutene isomerization step and a 3,4-dichlorobutene-1 dehydrochlorination step, said process for reducing the level of 1,4-DCB comprising the steps of combining waste water from the dichlorobutene isomerization step with sodium chloride brine from the 3,4-DCB dehydrochlorination step in such proportions that the concentration of sodium chloride in the combined solution is about 1-5 weight percent, and extracting the combined solution, maintained at a pH of less than about 6, with about 0.5-4.0 weight percent of a liquid hydrocarbon.

BRIEF DESCRIPTION OF THE DRAWING

The drawing is a schematic illustration of a continuous process of the present invention, as described in Example 7, below.

DETAILED DESCRIPTION OF THE INVENTION

In the practical operation of the process of the present invention, the aqueous waste, whether from the DCB isomerization step or from the 3,4-DCB dehydrochlorination step, will contain some organic materials as a separate, distinct, organic phase and some as a dispersed or even dissolved material. If a separate organic phase is present, it should first be removed by decantation. The two aqueous phases are then combined. Normally, the concentration of sodium chloride in the brine from the dehydrochlorination step is about 20 weight percent, so that the respective weight ratios of the brine to the waste water will vary from about 1:19 to 1:5.7. Considering that a relatively small volume of waste water from the DCB isomerization step is formed, compared with the volume of brine formed in the 3,4-DCB dehydrochlorination step, it will be necessary to use only a portion of the available plant brine to disposed of all the 1,4-DCB-containing waste water. The concentration of sodium chloride in the combined aqueous phases can be ascertained in any convenient manner, for example by specific gravity (density) determination. The presence of sodium chloride in the combined aqueous phase increases the efficiency of subsequent extraction. Above the maximum recommended level of sodium chloride the extraction efficiency is not adversely affected, but the resulting larger volume of the aqueous phase increases the capital cost of the equipment required or the operation of the present process to a point that it may no longer be commercially attractive.

The preferred sodium chloride concentration in the aqueous waste is about 2-3%, especially 2%. At this concentration, good phase separation is obtained in the subsequent extraction step, while the liquid volume is not unduly large.

Since brine from the 3,4-DCB dehydrochlorination step usually still contains a small amount of sodium hydroxide, it is necessary to acidify either the brine or the combined aqueous phases to retard hydrolysis or 3,4-DCB, which also is present among the chlorinated organic contaminants. The products of 3,4-DCB hydrolysis are to some extent soluble in the aqueous salt solution and cannot be satisfactorily extracted therefrom by hydrocarbons. The preferred acidifying agent is 98% sulfuric acid, although other concentrated mineral acids, especially hydrochloric acid, can be used.

The crucial step of the present process, extraction with a liquid hydrocarbon, is normally carried out with agitation, especially stirring. It has been found that mild agitation and long contact time are more effective than intense agitation and short contact time. Suitable liquid hydrocarbon solvents include virtually all aliphatic, aromatic, alicyclic, and araliphatic hydrocarbons, such, for example, as normal or branched pentanes, hexanes, heptanes, octanes, and nonanes; cyclopentane and cyclohexane; benzene, toluene, xylene; and mixtures of two or more hydrocarbons of the same or different groups. Preferred is No. 2 diesel oil, also known as flux oil, because of its low cost, availability, good extraction efficiency, and low solubility in aqueous salt solutions. At lower solvent concentrations, the extraction efficiency of liquid hydrocarbons decreases. At the lower end of the recommended range, the extraction efficiency is about 60%; at the high end, about 95%. Preferred is a hydrocarbon solvent concentration of about 2 weight percent, which for diesel oil gives an extraction efficiency of about 90%. Amounts of hydrocarbon above the maximum recommended level do not further increase the extraction efficiency to a measurable degree while they add to the cost of the process.

Following mixing of the organic liquid and the aqueous phase for the desired period, the organic phase is removed from the aqueous phase and incinerated. The aqueous phase is discharged, usually without further purification, into the natural body of water. Any additional steps, such as filtration or sedimentation or further pH adjustment, can be added without departing from the scope of the invention. It will be clear that the present process can be run either batchwise or continuously, and an average chemical engineer will be able to select both the correct equipment and the correct conditions such as, for example, the rates of agitation, rates of flow, and extraction or residence times.

This invention is now illustrated by the following examples of certain preferred embodiments thereof, where all proportions, parts and percentages are by weight, unless otherwise indicated.

EXAMPLE 1

Twenty mL of a plant dichlorobutene-waste mixture containing 29.1% of chloroprene, 20.1% of α-chloroprene (1-chlorobutadiene-1,3), 25.3% of 3,4-DCB, 4.0% of 1,4-DCB and 21.1% of other waste materials was added to 2000 g of 2% sodium chloride solution contained in a 4 liter sepatory funnel. The contents of the funnel were shaken vigorously for 30 seconds and the phases were allowed to separate for 4 hours. The aqueous salt phase was then decanted from the organic phase. For analysis, 500 grams of the aqueous phase was extracted with two 20 mL portions of methylene chloride. The extracts were combined and 0.05 mL of bromodecane was added as internal standard. The extract was analyzed by gas chromatography, and the relative weight proportions of the organic components present in the aqueous phase were determined as fractions of the total organic materials.

Two percent of flux oil (diesel No. 2 oil) was then added to the remainder of the aqueous phase. After vigorous shaking for 30 seconds, the phases were allowed to separate for 18 hours. The aqueous phase was then separated from the flux oil and a second methylene chloride extract was analyzed by gas chromatography as described above. The experimental data and results are summarized in Table I.

TABLE I

| | Component | | | | |
|---|---|---|---|---|---|
| | chloro-prene | α-chloroprene | 3,4-DCB | 1,4-DCB | Others |
| Relative proportion of component in initial organic mixture (known) | 0.291 | 0.201 | 0.253 | 0.040 | 0.211 |
| Relative proportion of organic component in aqueous salt phase prior to oil extraction (by gas chromatography) ppm of component in aqueous phase after | 0.315 | 0.219 | 0.316 | 0.050 | 0.100 |

TABLE I-continued

| | Component | | | | |
|---|---|---|---|---|---|
| | chloro-prene | α-chloroprene | 3,4-DCB | 1,4-DCB | Others |
| oil extraction (by gas chromatography) ppb of component in aqueous phase after dilution (calculated) | 27 | 19 | 53 | 10 | 13 |
| for 1700x dilution) | 15.8 | 11.2 | 31.2 | 5.9 | 7.6 |

The amount of 1,4-DCB in the diluted stream was well below the maximum tolerable limit of 27 ppb.

EXAMPLE 2

A 2% aqueous sodium chloride-dichlorobutene waste mixture having the composition given in Table II was extracted with 2% of flux oil as described in Example 1. The amount of 1,4-DCB was reduced from 7.7% to 19 ppm, which corresponded to 11.2 ppb in the final diluted stream.

TABLE II

| | Component | | | | |
|---|---|---|---|---|---|
| | chloro-prene | α-chloroprene | 3,4-DCB | 1,4-DCB | Others |
| Relative proportion of component in organic mixture (known) | 0.311 | 0.202 | 0.203 | 0.077 | 0.206 |
| Relative proportion of organic component in aqueous salt phase prior to oil extraction (by gas chromatography) | 0.371 | 0.220 | 0.231 | 0.089 | 0.085 |
| ppm of component in aqueous phase after oil extraction (by gas chromatography) | 38 | 23 | 33 | 19 | 16 |
| ppb of component in aqueous phase after dilution (calculated for 1700x dilution) | 22.3 | 13.5 | 19.4 | 11.2 | 9.4 |

EXAMPLE 3

A 1% aqueous sodium chloride-dichlorobutene waste mixture containing 10.4% of chloroprene, 38.7% of α-chloroprene, 24.7% of 3,4-DCB, 2.2% of 1,4-DCB and 24.0% of other waste materials was extracted with 2% of flux oil as described in Example 1. The amount of 1,4-DCB in the aqueous phase was reduced to 4.5 ppm after extraction and to 2.6 ppb after dilution.

EXAMPLE 4

A 2% aqueous sodium chloride-dichlorobutene waste mixture having the composition given in Table III was extracted with 2% of n-hexane by the procedure described in Example 1. After extraction, the level of 1,4-DCB in the aqueous phase was reduced to 3 ppm which was further reduced to 1.8 ppb in the final diluted waste stream.

TABLE III

| | Component | | | | |
|---|---|---|---|---|---|
| | chloro-prene | α-chloroprene | 3,4-DCB | 1,4-DCB | Others |
| Relative proportion of component in organic mixture (known) | 0.300 | 0.290 | 0.230 | 0.012 | 0.170 |

TABLE III-continued

| | chloroprene | α-chloroprene | 3,4-DCB | 1,4-DCB | Others |
|---|---|---|---|---|---|
| Relative proportion of organic component in aqueous salt phase prior to hexane extraction (by gas chromatography) | 0.260 | 0.210 | 0.410 | 0.030 | 0.090 |
| ppm of component in aqueous phase after hexane extraction (by gas chromatography) | 24 | 20 | 38 | 3 | 8 |
| ppb of component in aqueous phase after dilution (calculated for 1700x dilution) | 14.1 | 11.8 | 22.3 | 1.8 | 4.7 |

EXAMPLE 5

A 3% aqueous sodium chloride-dichlorobutene waste mixture containing 8.1% of chloroprene, 36.0% of α-chloroprene, 31.4% of 3,4-DCB, 1.6% of 1,4-DCB and 22.9% of other chlorinated waste materials was extracted with 2% of n-hexane by the procedure described in Example 1. The level of 1,4-DCB in the aqueous phase was reduced to 1 ppm after extraction and to 0.6 ppb after dilution.

EXAMPLE 6

A 1% aqueous sodium chloride-dichlorobutene waste mixture containing 4.3% of chloroprene, 38.5% of α-chloroprene, 15.8% of 3,4-DCB, 5.4% of 1,4-DCB and 36.0% of other waste materials was extracted with 0.71% of n-hexane by the procedure described in Example 1. The level of 1,4-DCB in the aqueous phase was reduced to 53 ppm after extraction and to 31.2 ppb after final dilution. It can be seen that the desired maximum 27 ppb concentration of 1,4-DCB after dilution was here slightly exceeded. Hexane is not quite as good an extractant as flux oil, which would have reduced the 1,4-DCB concentration to an acceptable level.

EXAMPLE 7

The Drawing represents a schematic flow diagram of the continuous extraction process described herein.

A 3% sodium chloride solution was adjusted to a pH of 5 with 98% $H_2SO_4$ and placed in holding tank A. The sodium chloride solution was pumped to mixing tank H and thoroughly contacted with a plant dichlorobutene waste mixture from vessel D. The mixture of aqueous sodium chloride and DCB waste was transferred to decanter B, where a separate lower aqueous medium chloride phase and the upper organic phase formed. Each phase was continuously removed from decanter B. The aqueous sodium chloride phase was pumped to extraction tank F and agitated for 20 minutes at 0.039 kW/1000 L with flux oil supplied from vessel E. The flux oil-aqueous salt mixture was then pumped to decanter C where two separate phases formed. Each phase was continuously removed from decanter C. The lower aqueous salt phase was removed at a rate sufficient to maintain a downward bulk velocity in vessel C of $5.1 \times 10^{-5}$ m/sec. All other flows were adjusted to maintain a continuous flow through the system. Samples of the aqueous phase were taken both at point G, before entering extraction tank F, and at the exit from decanter C and were analyzed for 1,4-DCB content by gas chromatography. Results are given in Table IV for different levels of flux oil added from vessel E.

TABLE IV

| Flux oil addition level, % | ppm 1,4-DCB in aqueous phase | |
|---|---|---|
| | from sample point G | from vessel C |
| 1.0 | 96.3 | 25.0 |
| 2.5 | 182.0 | 20.8 |
| 2.0 | 122.7 | 17.0 |
| 2.0 | 88.0 | 22.0 |
| 2.0 | 76.0 | 12.3 |
| 3.8 | 171.0 | 12.5 |
| 2.0 | 133.0 | 18.5 |

We claim:

1. A process for reducing the level of 1,4-dichlorobutene-2 in aqueous wastes from an integrated chloroprene-manufacturing process, said integrated process comprising at least a dichlorobutene isomerization step and a 3,4-dichlorobutene-1 dehydrochlorination step, said process for reducing the level of 1,4-dichlorobutene-2 comprising the steps of combining waste water from the dichlorobutene isomerization step with sodium chloride brine from the 3,4-dichlorobutene-1 dehydrochlorination step in such proportions that the concentration of sodium chloride in the combined solution is about 1–5 weight percent and extracting the combined solution, maintained at a pH of less than about 6, with about 0.5–4.0 weight percent of a liquid hydrocarbon.

2. The process of claim 1 wherein the concentration of sodium chloride in the combined solution is 2–3 weight percent.

3. The process of claim 2 wherein the sodium chloride concentration is about 2 weight percent.

4. The process of claim 1 wherein the liquid hydrocarbon is diesel No. 2 oil.

5. The process of claim 4 wherein the weight proportion of the oil is about 2% based on the aqueous solution.

6. The process of claim 1 wherein the pH of the aqueous solution is adjusted with 98% sulfuric acid.

7. The process of claim 1 in which the resulting extract of organic materials in liquid hydrocarbon is incinerated, and the aqueous solution after extraction with liquid hydrocarbon is discharged into a natural body or water.

* * * * *